Figure 1:
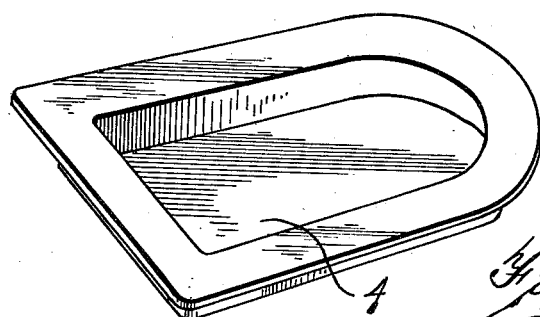

Nov. 24, 1925.

F. C. RUPPEL 1,562,519

CELLULOID MOLD FOR CEMENTITIOUS PLASTICS

Filed Sept. 10, 1923

INVENTOR.
Frederick C. Ruppel
BY
Edward W. Pagelsen
ATTORNEY.

Patented Nov. 24, 1925.

1,562,519

UNITED STATES PATENT OFFICE.

FREDERICK C. RUPPEL, OF GRAND RAPIDS, MICHIGAN, ASSIGNOR TO HAYES PRODUCTS COMPANY, OF GRAND HAVEN, MICHIGAN, A CORPORATION OF MICHIGAN.

CELLULOID MOLD FOR CEMENTITIOUS PLASTICS.

Application filed September 10, 1923. Serial No. 661,781.

*To all whom it may concern:*

Be it known that I, FREDERICK C. RUPPEL, a citizen of the United States, and residing at Grand Rapids, in the county of Kent and State of Michigan, have invented a new and Improved Celluloid Mold for Cementitious Plastics, of which the following is a specification.

This invention relates to molds for forming plastic materials such as Portland cement and the oxychlorides of magnesium or zinc combined with inert aggregates, which plastic materials often expand when setting and hardening, and its object is to provide a mold which is sufficiently resilient to expand with the plastic mass, which will withstand percussion without granulating, which can readily be restored to its proper form if it should warp or twist, and which shall have a minimum tendency to adhere to the plastic mass after that has hardened.

I have found that rigid molds of metal are undesirable for plastic materials which expand in setting as it is almost impossible to remove the plastic bodies without injury, even though the lineal expansion is no more than one-half of one per cent. I have also found that compound molds consisting of a rigid body and a lining of rubber or gelatine are undesirable when used in connection with percussion machines (such as those which are employed in iron foundries) to shake the air bubbles from the plastic mass, for the reason that both rubber and gelatine linings lose their shape and cannot be restored and rubber linings become granular because of a species of hysteresis or physical breaking down of the structure.

I have found that a mold formed from a sheet of celluloid properly shaped between proper dies, after being heated in boiling water, and permitted to cool between the dies, possesses qualities which render this material particularly valuable for this purpose, especially in connection with the oxychloride plastics. By "celluloid" I mean any of the nitro-cellulose plastics which appear in commerce under the trade-names of "celluloid", "pyralin", "fiberloid", "xylonite" etc. Sheets of celluloid shaped between proper dies retain their polished glassy surface to which the plastic material has little tendency to adhere. In fact, the plastic material may usually, before it has set, be poured out of molds having celluloid linings without perceptibly dimming the bright surface of the celluloid.

The molds may be filled with the plastic material and be placed on a percussion molding-machine so that the action on the plastic material is to cause the air bubbles therein to rise therein, and these celluloid molds will retain their shape for a long time. Should there be any tendency to granulate because of the long continued percussions, the molds can be brought back to their original condition by merely placing them in boiling water until they are soft and thereafter holding them in the forming dies until they have cooled. The surfaces of the plastic material in contact with the celluloid linings after the molds have been properly percussed become peculiarly glassy and are without pits or air bubbles.

Figure 3:
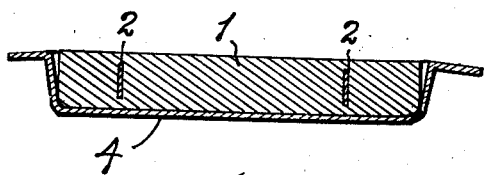
Figure 4:
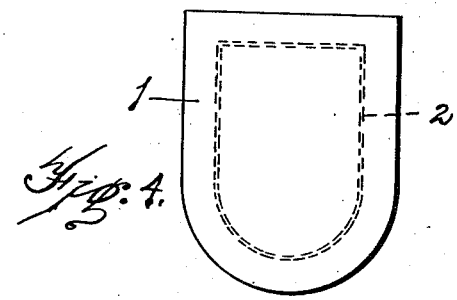
Figure 2:
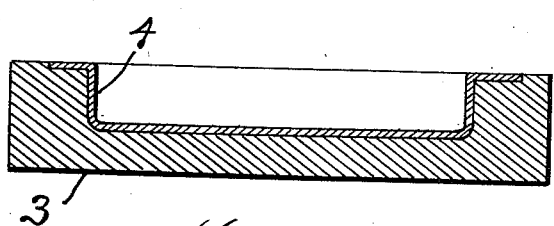

In the accompanying drawing, Fig. 1 is a perspective of a mold of celluloid. Fig. 2 is a transverse section of a mold and a support therefor. Fig. 3 is a section of a molded mass and the mold being removed therefrom. Fig. 4 is a plan of a molded block.

Similar reference characters refer to like parts throughout the several views.

The plastic body 1, shown in Fig. 4, is a cover for a toilet seat, being reinforced by means of the rod or band 2 of steel. I prefer this mass to contain a maximum amount of particles of cork ranging from pieces which will just pass through a quarter inch screen down to flour, and the cementitious material to be an oxychloride, such as the oxychlorides of zinc or magnesium, in amount just sufficient to fill the voids between these particles of cork.

The mold 4 is formed from a sheet of celluloid of uniform thickness which has been softened in boiling water and given its shape between proper dies where it was permitted to cool. The plastic material is poured into the mold and permitted to set, but I prefer to act upon the molded mass before it has set by means of a percussion machine which causes the plastic material to release the imprisoned air bubbles which rise to the surface of the plastic mass and escape, leaving the mass and particularly the surfaces in contact with the celluloid mold smooth and without pits or air holes. As stated before, the surface of the plastic mass next to the celluloid becomes glassy or polished and when of proper proportions and selection, is substantially unaffected by any water which may be poured thereon.

The plastic mass 1 expands slightly when setting, and therefore stretches the mold 4, but not sufficiently to rupture it or to prevent the plastic mass from being removed from the mold. After being so removed the mold can be sprung from the molded block 1 as shown in a somewhat exaggerated manner in Fig. 3. There seems to be practically no adhesion between Portland cement and oxychloride plastics and the celluloid linings so that the removal of the mold from the molded block is not resisted by such adhesion. In fact, I have noticed that the water used in wetting the oxychloride in making the cementitious mass will contract to globular form on the celluloid, showing that there must be a repulsion between them. The celluloid therefore is peculiarly adapted for forming the linings of molds for these cementitious plastics.

If desired, a support 3 may be provided for the celluloid mold, but I have found that good results can usually be obtained by the use of the mold 4 alone. However, this support may be found desirable where the transverse diameter of the mold exceeds twelve inches.

I claim:—

1. A mold for cementitious plastics consisting of a bottom and sides integral therewith and formed of a properly formed sheet of celluloid.

2. A mold for cementitious plastics comprising a bottom and sides integral therewith and formed of a sheet of celluloid having a substantially uniform thickness.

3. A mold for cementitious plastics comprising a bottom and sides integral therewith and formed of a sheet of celluloid having a substantially uniform thickness, and a rigid support for said mold.

FREDERICK C. RUPPEL.